United States Patent [19]

Kondo et al.

[11] Patent Number: 5,000,279
[45] Date of Patent: Mar. 19, 1991

[54] UNMANNED VEHICLE GUIDE SYSTEM

[75] Inventors: Yojiro Kondo; Fumio Yamauchi; Rikuo Sakaguchi, all of Tokyo, Japan

[73] Assignee: NEC Corporation, Japan

[21] Appl. No.: 395,180

[22] Filed: Aug. 17, 1989

Related U.S. Application Data

[63] Continuation of Ser. No. 122,274, Nov. 18, 1987, abandoned.

[30] Foreign Application Priority Data

Nov. 19, 1986 [JP] Japan .................. 61-178697[U]

[51] Int. Cl.$^5$ ............................................. B60T 7/16
[52] U.S. Cl. ................................ 180/168; 180/169; 246/194; 318/587
[58] Field of Search ................. 180/167, 168, 169; 318/587; 246/192 R, 193, 194; 104/88, 304, 242

[56] References Cited

U.S. PATENT DOCUMENTS

3,474,877 4/1967 Wesener .......................... 180/168
4,160,488 7/1979 Blakeslee ........................ 180/168

FOREIGN PATENT DOCUMENTS

| 668583 | 12/1965 | Belgium | 104/88 |
| 116114 | 9/1981 | Japan | 318/587 |
| 197906 | 11/1984 | Japan | 318/587 |
| 60-107113 | 6/1985 | Japan | 318/587 |
| 234407 | 10/1986 | Japan | 318/587 |

Primary Examiner—Andres Kashnikow
Assistant Examiner—Eric Culbreth
Attorney, Agent, or Firm—Laff Whitesel Conte & Saret

[57] ABSTRACT

An unmanned vehicle guide system has guide routes made of a magnetic material and an unmanned vehicle guided to travel on the guide route. The unmanned vehicle has an exciting coil for emitting a magnetic field, a pair of detection coils, arranged in a direction perpendicular to the travel direction of the unmanned vehicle, for detecting a magnetic field change, a comparator for measuring an output-difference between the detection coils, and a steering device for steering the unmanned vehicle such that the output-difference becomes a predetermined value. At an intersection where a plurality of guide routes intersect and in the vicinity thereof, at least one guide route lacks a magnetic material. Alternatively, an extra marker is added to each of the guide routes that intersect at the intersection.

3 Claims, 5 Drawing Sheets

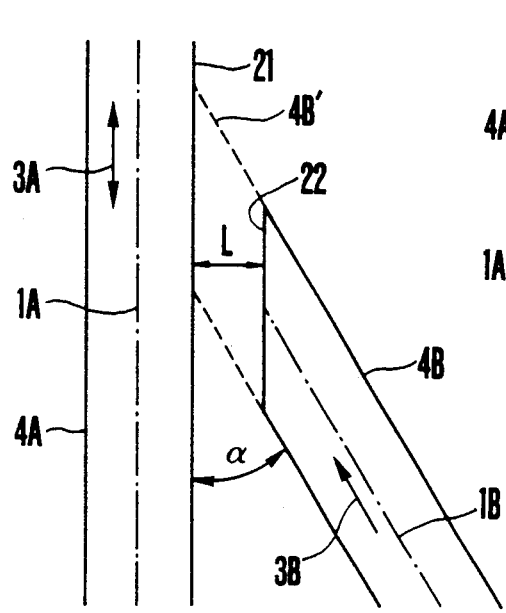
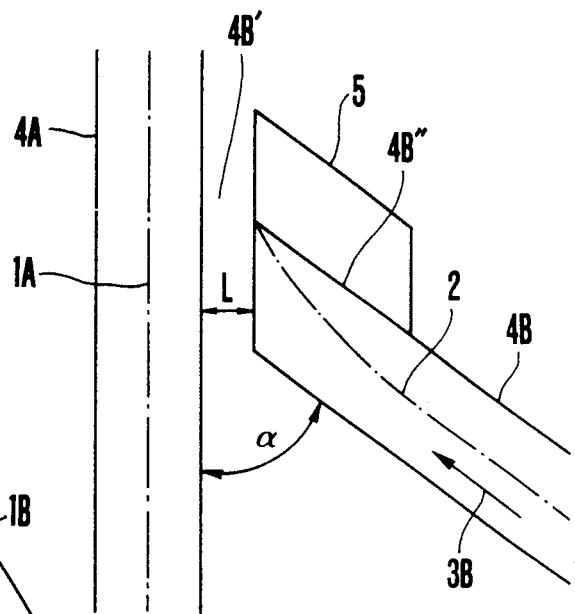
F I G. 5A    F I G. 5B
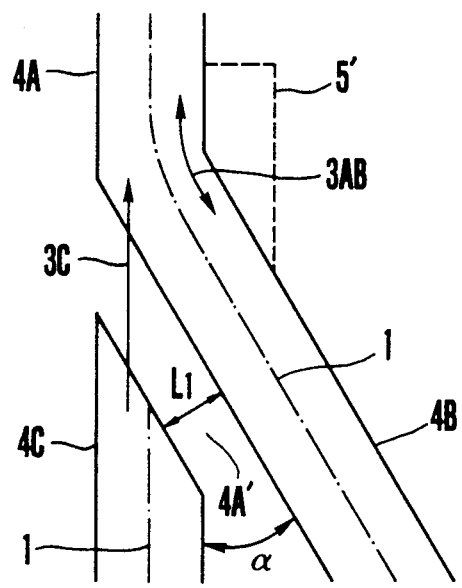
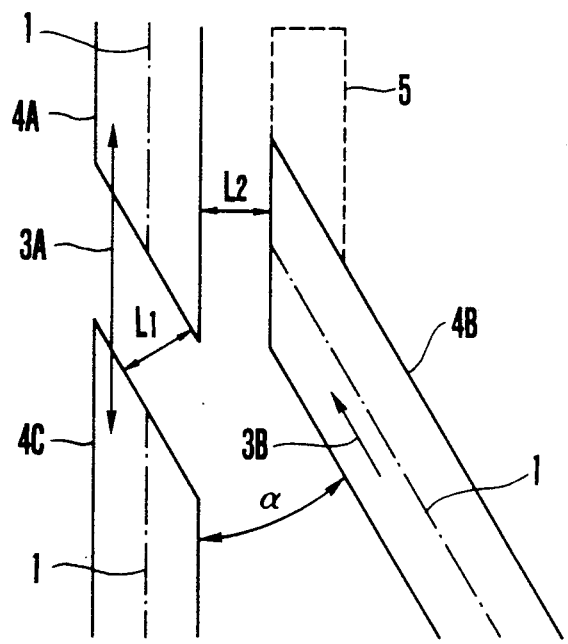
F I G. 6    F I G. 7

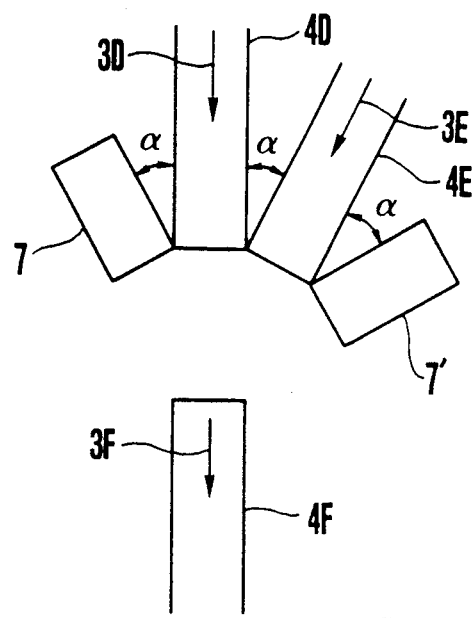
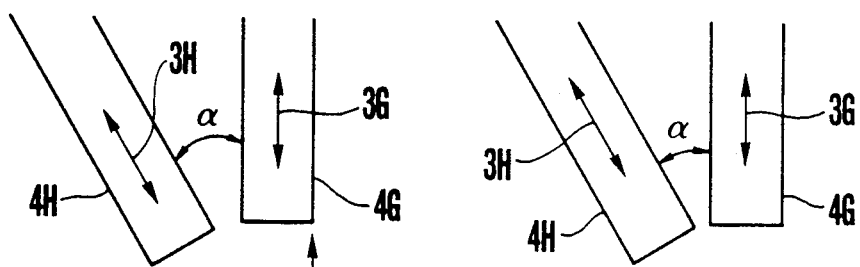
FIG.8
FIG.9               FIG.10

UNMANNED VEHICLE GUIDE SYSTEM

This application is a continuation of application Ser. No. 07/122,274, filed Nov. 18, 1987, now abandoned.

BACKGROUND OF THE INVENTION

The present invention relates to an unmanned vehicle guide system and, more particularly, to a structure of an intersection of guide routes comprising a magnetic material.

Recently, in factories, warehouses, hospitals, offices, and so on, an unmanned vehicle that moves on a guide route provided on a floor by control of a computer has been widely used.

In a well known unmanned vehicle guide system, an electromagnetic induction cable or a marker such as a light-reflecting plate, a belt-like metal plate, a magnetic material, and so on is provided along a travel route. In any such system, a factor to destabilize travel of an unmanned vehicle exists at a portion (to be referred to as an intersection hereinafter) where guide routes branch, merge, or intersect.

For example, in a guide system using an electromagnetic induction cable, in order to prevent electromagnetic interference between cables at an intersection of guide routes, currents of different frequencies are flowed in a plurality of cables, respectively. An unmanned vehicle selects by detecting only a cable having a designated frequency so that it switches to a desired direction at an intersection. With such a guide route comprising a plurality of cables in which currents of different frequencies are flowed, it is difficult to obtain a complex route course. Furthermore, since the cables are buried in the floor, it is difficult to change the cable layout.

In a guide system using a light-reflecting plate such as an aluminum foil, an unmanned vehicle is switched by detecting a marker provided in the vicinity of an intersection of guide routes or by optically detecting an intersection by utilizing the large width of a guide route at the intersection. Since marker installation is easy, it is easy to change the guide route layout However, since a damaged or soiled portion of the light-reflecting plate constituting the guide route causes noise, off-the-route or unstable travel occurs, and maintenance becomes cumbersome.

In a guide system (to be referred to as a magnetic guide system hereinafter) as an object of the present invention wherein a guide route comprises a magnetic material, the guide route is made by a magnetic material such as iron powder or ferrite. The unmanned vehicle has a magnetic sensor including a single exciting coil, for exciting a magnetic field over the magnetic guide, and a pair of detection coils, arranged on two sides of the exciting coil along a direction perpendicular to the travel direction of the unmanned vehicle, for detecting a magnetic field change due to the guide. The sensor further includes a comparator for obtaining a difference between the output voltages of the pair of detection coils, and an amplifier for amplifying an output from the comparator. An output from the amplifier is supplied to a steering motor that determines the travel direction of the unmanned vehicle. U.S. patent application Ser. No. 796,209 filed by the present applicant clearly describes the actual structure of the guide system.

FIGS. 1A and 1B show the guide principle of the magnetic guide system.

FIG. 1A shows a magnetic sensor S attached to an unmanned vehicle and a magnetic guide 4 extending in the Y-direction (perpendicular to the surface of the sheet of the drawing), and indicates sensor components, exciting coil E and a pair of detection coils A and B. Circles M drawn in broken lines represent a magnetic field emitted from the exciting coil E. The unmanned vehicle runs along the guide 4 fixed on the floor, by an automatic steering not to deviate in the X-axis direction (arrow L or R).

Referring to FIG. 1B, the abscissa corresponds to the X-axis of FIG. 1A, curves 11 and 12 respectively indicate a change in the voltage output of the detection coils A and B with respect to the lateral deviation of the unmanned vehicle in the X-axis direction, and a curve 13 indicates a difference between the output voltages 11 and 12 (the curves 11 and 12).

When the unmanned vehicle swings to the right or left during travel, the difference voltage changes along the curve 13 and becomes 0 when the unmanned vehicle comes just above the guide 4. Namely, the unmanned vehicle steers automatically such that the difference voltage 13 (the curve 13) keeps 0 V.

In the magnetic guide system, no electric power is required for the guide route, and, moreover, the control of the unmanned vehicle is not influenced by the damaged or soiled portion of the guide route. Also, since the guide route can be obtained only by adhering or coating a magnetic material, its installation or layout change can be easily performed.

However, the following problem arises at an intersection of the guide routes

FIGS. 2 and 3 show a defect at an intersection of guide routes of a conventional magnetic guide system.

FIG. 2 shows a three-forked intersection of a guide 4. An alternate long and short dashed line 1 indicates a travel track (to be referred to as a 0-V line hereinafter) at which the sensor output voltage 13 becomes 0 during the unmanned vehicle travelling on the guide 4 in a direction of arrow 3. In FIG. 2, a solid curve 15 and a broken line 16 represent travel tracks of the unmanned vehicle at which the sensor output voltage 13 becomes maximum and minimum, respectively.

FIG. 3 shows a 0-V line 1 of a cross intersection.

As apparent from FIGS. 2 and 3, since the width of the magnetic material constituting the guide 4 is large at the intersection, the unmanned vehicle is influenced by a change in the magnetic profile, and the 0-V line goes zig-zag. As a result, the unmanned vehicle steered to travel along the 0-V line starts travelling in a zig-zag manner and may travel off the route when the vehicle speed is high.

FIG. 4 shows an example of countermeasures conventionally provided to prevent off-the-route travel of an unmanned vehicle caused by zig-zag travelling. Referring to FIG. 4, a marker 17 made of a metal or a magnetic material is arranged in the vicinity of an intersection. The unmanned vehicle is provided with an extra sensor for detecting the marker 17. When an unmanned vehicle comes near an intersection, a marker 17 set at the intersection is detected by the extra sensor and the unmanned vehicle is forcibly decelerated by a travel control program.

However, such a countermeasure for prevention of zig-zag travel requires the marker 17 to be provided at the intersection, the extra sensor for detecting the marker 17, and a travel control program. In addition, when the layout is to be changed, the software must also be changed in a complex manner.

SUMMARY OF THE INVENTION

It is an object of the present invention to eliminate above problems of the conventional technique and to provide a guide system wherein an unmanned vehicle does not travel in a zig-zag manner at an intersection without providing an extra marker representing the intersection or an extra sensor for detecting the marker.

It is another object of the present invention to provide an unmanned vehicle guide system wherein a guide route layout can be easily changed within a short period of time and at a low cost without changing conventional software when the object to use the system is changed or the time during which the system is used is prolonged.

An unmanned vehicle guide system according to the present invention comprises a guide route made of a magnetic material and an unmanned vehicle guided to travel on the guide route. The unmanned vehicle comprises an exciting coil for emitting a magnetic field, a pair of detection coils, arranged in a direction perpendicular to the travel direction of the unmanned vehicle, for detecting a magnetic field change, electric means for measuring an output-difference between the detection coils, and steering means for steering the unmanned vehicle such that the output-difference becomes a predetermined value. At an intersection where a plurality of guide routes intersect and in the vicinity thereof, at least one guide route lacks a magnetic material Alternatively, an extra marker is added to each of the guide routes that intersect at the intersection.

BRIEF DESCRIPTION OF THE DRAWINGS

FIGS. 5A, 5B, 6, 7, and 8 are plan views showing various examples of three-forked intersections according to the present invention; and FIGS. 9, 10, 11, 12, 13 and 14 are plan views showing various examples of cross intersections of guide routes according to the present invention.

DETAILED DESCRIPTION OF PREFERRED EMBODIMENT

Figure 1A:
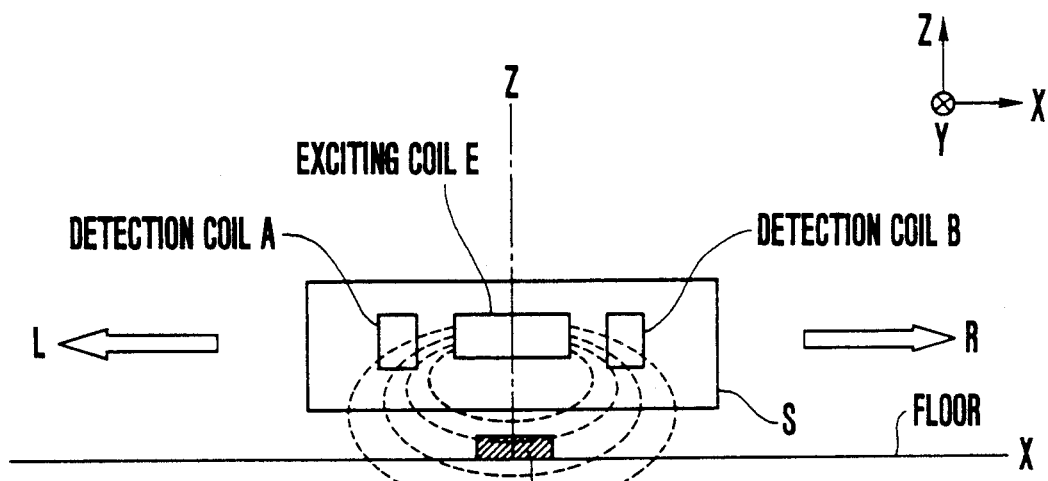
FIGS. 1A and 1B are views for explaining the principle of travel control of an unmanned vehicle.
Figure 1B:
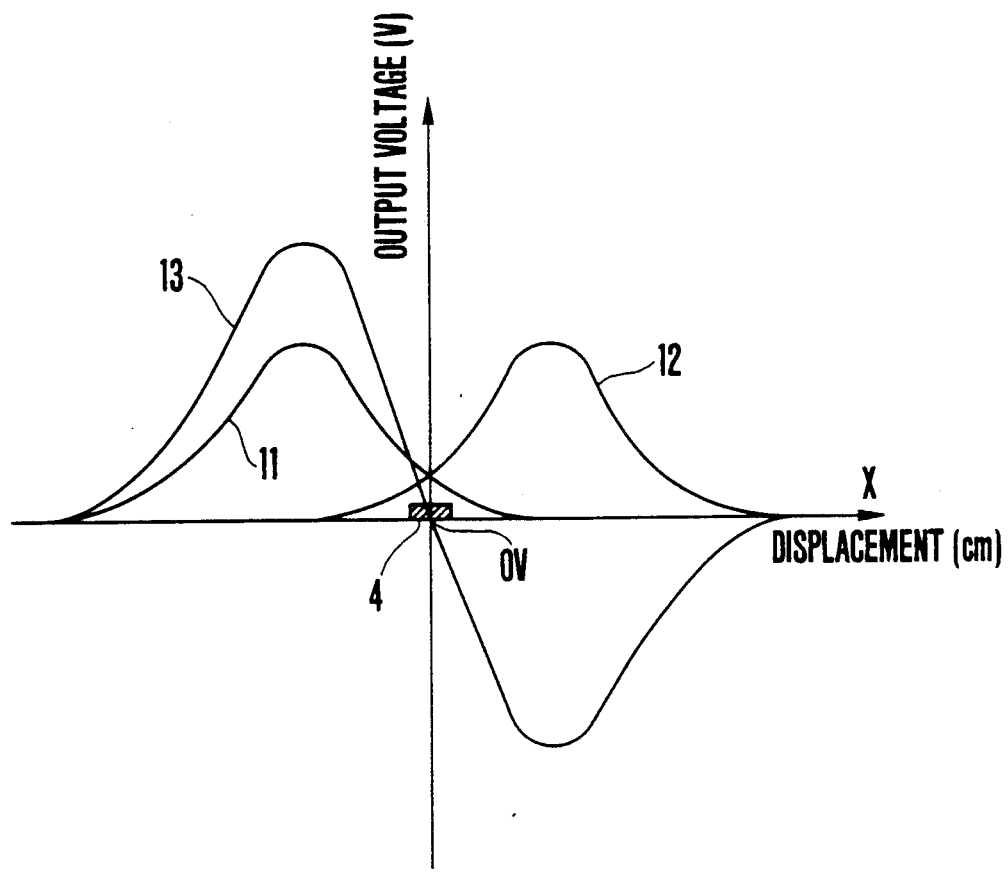
Figure 2:
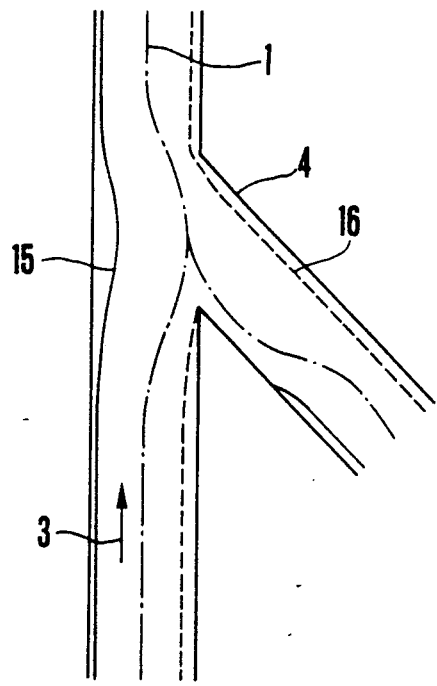
FIGS. 2, 3, and 4 are views for explaining a defect at an intersection in a conventional technique.
Figure 3:
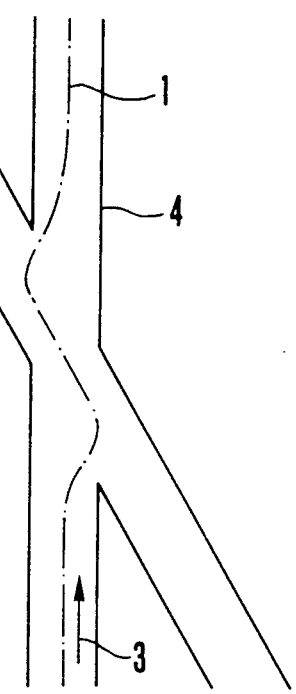
Figure 4:
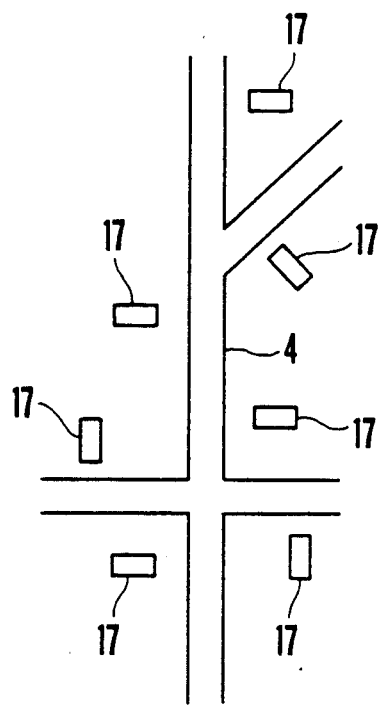

A guide system according to an embodiment of the present invention will be described in detail with reference to the accompanying drawings.

In the following examples, a magnetic guide route is formed by thermally painting, on a road or floor, a mixture containing 84% by weight of magnetic ferrite ($Fe_3O_4$) and 16% by weight of a petroleum resin. The magnetic guide paved on a road has a width and thickness of, e.g., 10 cm and 5 mm, respectively. A versatile sensor used here can sufficiently detect the magnetic guide from a position 4 to 10 cm above the road surface.

FIG. 5A shows an example of a branch intersection of a guide route of a guide system of the present invention.

Referring to FIG. 5A, a guide route 4B branches from a guide route 4A at a crossing angle of α. An unmanned vehicle can travel on the guide routes 4A and 4B in both directions indicated by arrows 3A and a direction shown by an arrow 3B. In FIG. 5A, a root portion 4B' where the guide route 4B branches from the guide route 4A lacks a magnetic material. The size of this portion 4B' lacking a magnetic material (to be referred to as a nonmagnetic portion hereinafter) of the guide route 4B is, e.g., L. Namely, the nonmagnetic portion 4B' extends between a side line 21 of the guide route 4A and a line 22 parallel to and spaced apart from the side line 21 by L. When the guide routes 4A and 4B are magnetically separated at the intersection in this manner, 0-V lines 1A and 1B of the guide routes 4A and 4B, respectively, do not extend in a zig-zag manner. As a result, the unmanned vehicle traveling on the guide route 4A does not travel in a zig-zag manner at the intersection. Meanwhile, when an unmanned vehicle enters from the guide route 4B to 4A, it is not steered while it moves between the lines 22 and 21. However, it moves straight by inertia and enters the guide route 4A.

An inertia travel distance, that is, a distance allowed for an unmanned vehicle to travel by inertia without being steered is determined by the speed of the unmanned vehicle and a time preset in a program necessary for off-the-route detection. The width L of the nonmagnetic portion 4B' is sufficient if it is adjusted to fall within the inertia travel distance.

The smaller the crossing angle α, the more easily the unmanned vehicle enters from the guide route 4B to 4A. When the angle o is large, or when the travel speed is high, the vehicle tends to move straight and travel off the route before being steered to move along the guide route 4A.

FIG. 5B is a modification of the example of FIG. 5A and shows an example of a case when the crossing angle α is large.

Referring to FIG. 5B, a nonmagnetic portion 4B' is formed in a guide route 4B in the same manner as in FIG. 5A. A magnetic marker 5 is provided outside a side line 4B" of a guide route 4B, which forms a larger angle than the other side line of the guide route 4B with respect to the guide route 4A. As a result, a 0-V line 2 of the guide route 4B is bent toward the side of the marker 5. The unmanned vehicle that travels on the 0-V line 2 travels on a curve extending from the 0-V line 2 even if it travels on the nonmagnetic portion 4B' by inertia. The entering angle at which the unmanned vehicle enters the guide route 4A becomes small compared to a case where no marker 5 is provided and the vehicle moves straight As a result, off-the-route travel of the unmanned vehicle can be prevented.

FIG. 6 shows a guide route according to another embodiment of the present invention.

Referring to FIG. 6, a nonmagnetic portion 4A' having a width L1, e.g., 8 cm, is formed so as to be parallel to a guide route 4B. An unmanned vehicle can enter the branch guide route 4B from the guide route 4A as indicated by arrow 3AB. In this case, the crossing angle α can be 30° or less. When the crossing angle is larger than 30°, if the travel speed is high or if the magnetic field is weak due to a small content of a magnetic material, the unmanned vehicle easily travels off the route. When a marker 5' indicated by a broken line in FIG. 6 is added in order to prevent this, the curve of the 0-V line at a junction of the guide routes 4A and 4B becomes moderate and off-the-route travel of the unmanned vehicle can thus be prevented.

In FIG. 7, the guide route 4B of FIG. 6 is separated from the guide route 4A by a width of L2, e.g., 4 cm in a parallel manner. In this case an unmanned vehicle can travel on the guide routes 4A, 4B, and 4C in directions indicated by arrows 3A and 3B. The embodiment of FIG. 7 can be used for a merging pattern for allowing an unmanned vehicle to enter a linear line from a branch line, unlike in FIG. 6. In terms of a function, the merging route of FIG. 7 is the same as that of FIG. 5A. When the guide route 4B is connected to the guide route 4A, the merging pattern becomes the branch pattern of FIG. 6. In this manner, branch/merge control can be performed by manually or automatically performing connection and disconnection of guide routes.

Referring &o FIG. 8, an intersection comprises guide routes 4D and 4E merging at a crossing angle of and a guide route 4F extending from the guide route 4D. An unmanned vehicle can travel in directions indicated by arrows 3D, 3E, and 3F. Distal end portions of the guide routes 4D and 4E that cross each other are cut perpendicularly to the travel directions 3D and 3E, respectively, of the unmanned vehicle A portion of the guide route 4F where the central lines of the guide routes 4D and 4E cross is also cut perpendicularly to the travel direction 3F of the unmanned vehicle A rectangular marker 7 is provided on a side of the guide route 4D opposite to the guide route 4E to define an angle of $\alpha$ or $\alpha \pm 10°$ with the guide route 4D. A marker 7' is provided on a side of the guide route 4E opposite to the guide route 4D in accordance with the same principle as for the marker 7. The width of the markers 7 and 7' is the same as those of the guide routes 4D and 4E, that is 10 cm, and a length thereof is twice its width, that is, 20 cm. The markers 7 and 7' cancel magnetic influences caused by the adjacent guide routes and acting on the 0-V lines of the corresponding guide routes 4D and 4E, so that the 0-V lines are connected to the 0-V line of the guide route 4F without extending in a zig-zag manner. The shape and the range of angle $\alpha \pm 10°$ of the markers 7 and 7' are defined to be most effective in cancelling the magnetic influences considering the shape of the guide routes 4D and 4E, the material of the magnetic material, the influence to the sensor, and so on.

The shape and size of disconnection of the above merge/branch routes, the shape and size of the extra marker, and the angle at which the extra marker is provided are different depending on the size and height of the sensor, travel speed, a time (to be referred to as a sensor time constant) for sending a detection signal, an off-the-route detection time, and the shape and size of the site where the guide routes are to be provided, and can be determined easily when measurement is performed in accordance with the method shown in FIGS. 1A and 1B, 2, and 3.

An example of a cross intersection will be described.

When two guide routes cross perpendicularly t a cross intersection, they are detected as the same value by two sensors since they are symmetrical with respect to the sensors. A 0-V line 1 of each guide route at which a differential output voltage becomes 0 is located substantially at a central position of the guide route. Thus, off-the-route travel of the unmanned vehicle does not occur. However, when the two guide routes cross at an angle smaller than 90°, as in the drawings, each 0-V line extends in a zig-zag manner, as described above. Therefore, if an unmanned vehicle is controlled to travel on the 0-V line, it can easily travel off the route.

FIG. 9 shows an example of a cross intersection of the present invention.

Referring to FIG. 9, an unmanned vehicle travels on guide routes 4G and 4G', and 4H and 4H' in directions indicated by arrows 3G and 3H. A nonmagnetic zone 10 where no magnetic material exists is provided between the guide routes 4G and 4G' and 4H and 4H' to have a length of L3. The length L3 of the nonmagnetic zone 10 is 35 cm when a crossing angle $\alpha$ defined by guide route lines 4G - 4G' and 4H - 4H' is 45°, and 60 cm when the angle is 30°. The nonmagnetic zone 10 may be called a 0-V zone. When an unmanned vehicle travels the zone 10 by inertia, it travels straight through this zone 10 and enters the opposing guide route. The shape and size of the nonmagnetic zone 10 are different depending on the size and height of the sensor, the travel speed of the unmanned vehicle, the time constant of the sensor, and the off-the-route detection time set in the steering program, and can be determined easily when measurement is performed in accordance with the method shown in FIGS. 1B, 2, and 3.

Referring to FIG. 10, a rectangular marker 18 having a width and length of, e.g., 10 cm and 14 cm, respectively, is disposed at a central position of the nonmagnetic zone 10 shown in FIG. 9. A slight travel displacement of the unmanned vehicle during inertia travel can be corrected since the sensor detects the marker 18 and the unmanned vehicle is guided accordingly to the central portion of the intersection. As a result, the unmanned vehicle can travel straight.

Figure 11:
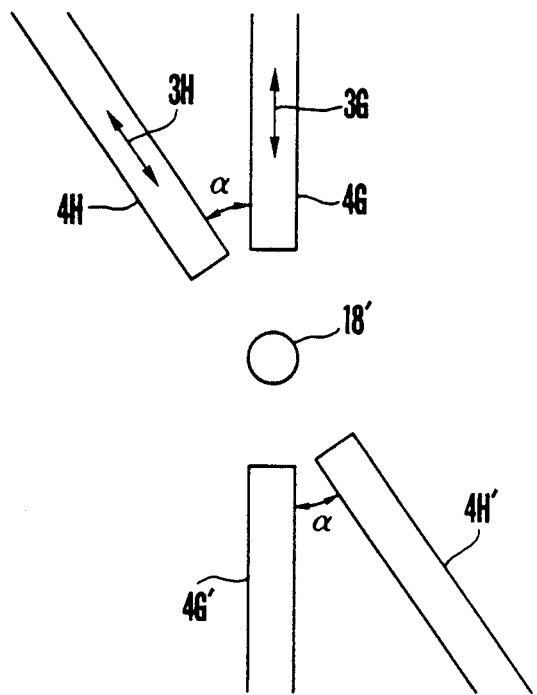

In FIG. 11, the rectangular marker 18 of the example shown in FIG. 10 is replaced by, e.g., a circular marker 18' having a radius of 7 cm. With a circular marker, a 0-V line always passes the center of the circle. The circular marker thus serves as a symmetrical marker with respect to a travel line in any direction. The influence of the crossing angle $\alpha$ can be neglected, unlike in the case of a rectangular marker. Therefore, an unmanned vehicle traveling from any direction can be controlled to pass the central portion of the intersection.

Figure 12:
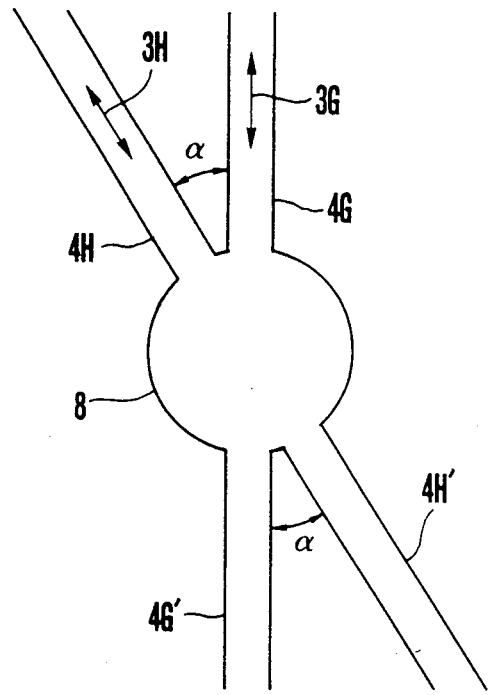

FIG. 12 shows another example of a cross intersection. In the intersection shown in FIG. 12, unlike in the case of FIGS. 9 to 11, the central portion of the intersection is not cut, but a circular marker 8 having a radius of, e.g., 8 cm, is placed at the central portion of the intersection. Since the circular marker 8 has a sufficient size to cover the detection range of the sensor, a wide 0-V area is provided at the central portion of the intersection. Thus, the intersection shown in FIG. 12 is basically an intersection for allowing an unmanned vehicle to travel by inertia and to move straight.

Figure 13:
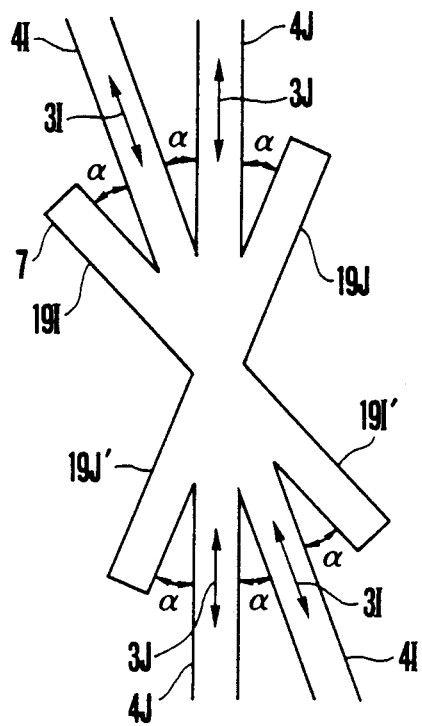

FIG. 13 shows an intersection wherein each of markers 19I, 19I', 19J, and 19J' is provided on a side of each guide route opposite to the adjacent guide route. The angle defined by each marker and the corresponding guide route is the same as the crossing angle $\alpha$ defined by the two adjacent guide routes at the central portion of the intersection, or $\alpha \pm 10°$. The magnetic influences of the adjacent guide routes are cancelled, and the vehicle travels straight as indicated by arrows 3I and 3J. The above range of the angle at which each of the markers 19I, 19I', 19J, and 19J' is provided is suitable when the markers have the same shape and the same magnetic power as those of the corresponding adjacent guide routes. If different types of markers are used or if markers having different magnetic powers or shapes are used, the above range is unsuitable.

Figure 14:
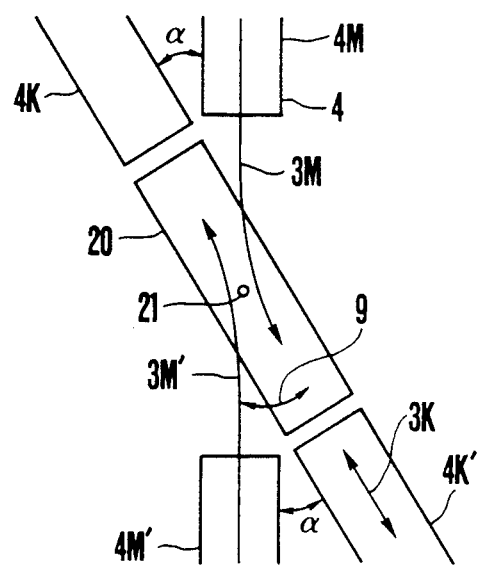

FIG. 14 shows still another example of a cross intersection. A nonmagnetic zone is provided between guide routes 4K and 4K', and 4M and 4M', each pair of which extend on a straight line, and a rectangular marker 20 is provided in the nonmagnetic zone to extend on a line connecting the guide routes 4K and 4K'. The marker 20 can be rotated in the directions of arrow 9 manually or automatically about its axis 21. As a result, the travel direction of the unmanned vehicle can be controlled.

Various embodiments of the present invention described above concerning an intersection comprising a cross intersection, merge, or branch intersection, can be roughly classified into a method wherein a marker is cut or separated so as to remove a magnetic influence of an adjacent guide route, and a method wherein a marker is provided in the vicinity of the intersection so as to cancel the magnetic influence. The characteristic feature of the present invention resides in a combination of the two methods. Therefore, the accompanying drawings are provided only for the sake of explanation and the present invention is not limited to those specifically shown in the drawings. It is a matter of course that the shape with which the extra marker is cut or separated, and the shape and angle of the extra marker are different depending on the size and height of the sensor, the travel speed of the unmanned vehicle, the time constant of the sensor, the off-the-route detection time and its free-running distance, and the shape of the site where the guide route is installed. The relationship among these factors can be determined in accordance with the method described with reference to FIGS. 1B, 2, and 3. The intersection according to the present invention can also be applied when a guide route is constituted by a curve.

An electromagnetic induction coil is applied to the sensor used in the magnetic guide system of the present invention. This sensor detects not only magnetism but also electricity, as is apparent from the viewpoint of physics. When a conductor such as a metal is influenced by the magnetic field, an eddy current is induced in the conductor to change the magnetic field profile, thereby changing the voltage of the detection coil. The conductor is detected in this manner. Therefore, the present invention can naturally be applied to a guide route wherein a conductor is used as a marker.

When an intersection of the present invention is used in a guide route of a magnetic material guide system wherein an unmanned vehicle loading a sensor thereon travels as it is guided by a magnetic marker as the guide route, the vehicle can be controlled only by a basic steering device for straight travel. The guide route using the magnetic marker can be easily installed by adhering or casting, and is inexpensive. The guide route layout can be easily changed. Therefore, the guide route using the magnetic marker can quickly respond to a layout change in accordance with various applications. Conventionally, an intersection control method used for direction control at an intersection comprises a marker not related to a guide route, a sensor for detecting the marker, and software for controlling the vehicle direction. In contrast to this, according to the method of the present invention, the travel direction at an intersection can be controlled only by changing the shape of the intersection. The guide route layout can thus be easily changed. When the conventional method and the intersection of the present invention are combined, directional control at an intersection can be performed more freely.

In the present invention, no exciting coil is needed if the guide route is made of a permanent magnet.

What is claimed is:

1. An unmanned vehicle guidance system comprising a plurality of guide routes made of and marked by a magnetic material having a particular width, non-magnetic interruptions in the magnetic material at locations where the marking of the magnetic material would cause an unintended change in course, and an unmanned vehicle guided responsive to a marking provided by said magnetic material for running along said guide routes, a pair of detecting means arranged perpendicularly to a travel direction of said unmanned vehicle for detecting a magnetic field change caused by said magnetic material in order to command an automatic steering to be performed by said vehicle in such manner that a difference between outputs of said pair of detecting means is at a predetermined value in the vicinity of an intersection where said plurality of guide routes intersect, an electromagnetic marker made of the magnetic material being added to said guide routes, and said electromagnetic marker comprising a comparatively small island-like marker made of a magnetic material at an within said non-magnetic portion of said guide route, said island-like marker correcting a slight travel displacement of said unmanned vehicle responsive to the inertia of said vehicle during its travel through the non-magnetic portion, the island-like marker being made of electro-magnetic material having an outside shape which is entirely included within the particular width of a projection of said guide route within said non-magnetic portion of said guide route.

2. An unmanned vehicle guide system according to claim 1 wherein said both said guide route and said marker are made of the same magnetic material.

3. An unmanned vehicle guide system, comprising a plurality of guidance routes made of and marked by a magnetic material, and an unmanned vehicle for running along said guide routes under the guidance of said magnetic material, a pair of detecting means arranged perpendicularly to a travel direction of said unmanner vehicle for detecting a magnetic field change resulting from said magnetic material in order to command an automatic steering of said vehicle which is performed in such manner that a difference between outputs of said pair of detecting means is at a predetermined value, at an intersection where said plurality of guide routes intersect and in the vicinity thereof, at least one of said guide routes having said route marking magnetic material interrupted by a non-magnetic portion from which the magnetic material is removed in order to prevent a zig-zag motion of said unmanner vehicle at the intersection and in the vicinity thereof due to a magnetic interaction between the marking of one guide route on which said unmanned vehicle has to travel and the marking of another guide route intersecting with said one guide route, and a comparatively small island-like marker made of the magnetic material and located within the interruption forming the non-magnetic portion of the route marking to correct a slight travel displacement of said unmanned vehicle responsive to the inertia of said vehicle during its travel through the non-magnetic portion, wherein said island-like maker has a rectangular shape.

* * * * *